(12) United States Patent
Sanchez

(10) Patent No.: US 8,914,987 B2
(45) Date of Patent: Dec. 23, 2014

(54) I-BEAM LEVEL

(75) Inventor: Albert Sanchez, Naugatuck, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 290 days.

(21) Appl. No.: 13/363,100

(22) Filed: Jan. 31, 2012

(65) Prior Publication Data

US 2013/0192075 A1    Aug. 1, 2013

(51) Int. Cl.
*G01C 9/24* (2006.01)
*B23Q 17/00* (2006.01)
*G01C 9/10* (2006.01)

(52) U.S. Cl.
USPC ............................................. 33/379; 33/451

(58) Field of Classification Search
USPC ........................................... 33/370, 371, 379
See application file for complete search history.

(56) References Cited

U.S. PATENT DOCUMENTS

| | | | |
|---|---|---|---|
| 523,023 A | 7/1894 | Traut | |
| 1,583,957 A | 5/1926 | Carrier | |
| 2,557,291 A | 6/1951 | Hubbard | |
| 4,011,660 A | 3/1977 | Johnson | |
| 4,208,803 A | 6/1980 | Brown et al. | |
| 4,335,524 A * | 6/1982 | Schimming | 33/388 |
| 4,503,623 A * | 3/1985 | Gould, Jr. | 33/379 |
| 4,574,491 A * | 3/1986 | Vining | 33/366.21 |
| 4,581,828 A * | 4/1986 | Handler et al. | 33/379 |
| 5,412,876 A | 5/1995 | Scheyer | |
| 5,755,037 A | 5/1998 | Stevens | |
| 6,568,095 B2 | 5/2003 | Snyder | |
| 6,760,975 B1 * | 7/2004 | Schmidt | 33/382 |
| 6,990,742 B1 | 1/2006 | Schmidt | |
| 7,047,654 B2 * | 5/2006 | Szumer | 33/379 |
| 7,204,029 B2 * | 4/2007 | Tran et al. | 33/451 |
| D546,214 S | 7/2007 | Schwartz et al. | |

(Continued)

FOREIGN PATENT DOCUMENTS

| | | |
|---|---|---|
| DE | 329088 | 11/1920 |
| DE | 2440751.0 | 3/1975 |

(Continued)

OTHER PUBLICATIONS

Extended Search Report, including the Search Opinion, as issued for European Patent Application No. 13153174.1, dated May 17, 2013.

(Continued)

*Primary Examiner* — Yaritza Guadalupe-McCall
(74) *Attorney, Agent, or Firm* — Pillsbury Winthrop Shaw Pittman LLP

(57) ABSTRACT

A level includes a body comprising a first portion having a first reference surface, and a second portion having a second reference surface, the second reference surface being spaced from the first reference surface. The body also includes an intermediate member comprising a wall positioned between the first and second portions, the wall being generally perpendicular to at least one of the reference surfaces. The level also includes an orientation indicator coupled to the intermediate member, the orientation indicator being positioned to indicate an orientation of at least one of the first and the second reference surfaces. The level additionally includes an indicator support configured to support the orientation indicator, and a resilient member positioned between the orientation indicator and the indicator support. A compression the resilient member facilitates a calibration of the orientation indicator, while the indicator support supports the resilient member and engages opposite sides of the wall.

23 Claims, 8 Drawing Sheets

(56) References Cited

U.S. PATENT DOCUMENTS

| | | | |
|---|---|---|---|
| 7,316,074 B2 * | 1/2008 | Tran et al. | 33/451 |
| D563,808 S | 3/2008 | Schwartz et al. | |
| 7,360,316 B2 * | 4/2008 | Hoover et al. | 33/379 |
| 7,360,317 B1 | 4/2008 | Lavalle | |
| 7,472,487 B2 | 1/2009 | Tran et al. | |
| 7,765,706 B2 | 8/2010 | Scheyer | |
| 7,832,112 B2 | 11/2010 | Christianson | |
| 8,056,249 B1 * | 11/2011 | Morrissey | 33/451 |
| 8,291,605 B2 * | 10/2012 | Christianson et al. | 33/379 |
| 8,375,591 B2 * | 2/2013 | Christianson et al. | 33/379 |
| 2001/0045020 A1 | 11/2001 | Tacklind | |
| 2003/0140511 A1 | 7/2003 | Obergoenner | |
| 2004/0025360 A1 | 2/2004 | Obergoenner | |
| 2005/0144796 A1 * | 7/2005 | Szumer | 33/379 |
| 2007/0234581 A1 * | 10/2007 | Ming | 33/451 |
| 2013/0192075 A1 * | 8/2013 | Sanchez | 33/379 |

FOREIGN PATENT DOCUMENTS

| | | |
|---|---|---|
| DE | 3215667 | 10/1983 |
| DE | 8711516 | 10/1987 |
| EP | 0 023 190 | 1/1981 |
| EP | 0 070 476 A1 | 1/1983 |
| EP | 0 238 897 | 9/1987 |
| EP | 0 982 567 B | 3/2000 |
| EP | 1 719 974 A2 | 11/2006 |
| EP | 1 860 399 | 11/2007 |
| EP | 2 065 677 A | 6/2009 |
| GB | 2 443 057 B | 4/2008 |
| JP | 11-183167 | 7/1999 |
| WO | WO 02/27271 | 4/2002 |
| WO | WO 2010/006262 | 1/2010 |
| WO | WO 2011/059475 | 5/2011 |

OTHER PUBLICATIONS

Canadian Office Action issued in Canadian Patent Application No. 2,588,291, dated Oct. 10, 2014.

* cited by examiner

I-BEAM LEVEL

BACKGROUND

1. Field of the Invention

The present invention relates generally to hand-held levels for determining an angular orientation of a surface, and relates more specifically to the assembly of a bubble vial into such levels.

2. Description of Related Art

Levels are typically used in the construction or home improvement industry to determine an angular orientation of a surface against which the level is placed or aligned, and may help a user to confirm whether the level is flush against the surface, identify unevenness in the surface being measured, or so on. Such levels typically include one or more bubble vials (also known as spirit vials) that are oriented at predetermined angles relative to a reference surface of the level. For example, such vials are typically oriented at 0 degrees, 45 degrees, and/or 90 degrees, relative to the reference surface of the level.

During assembly of the levels, the bubble vials must be angularly positioned in the pre-determined angle, so that such an orientation of the reference surface indicates the same with the bubble vial. It may be appreciated, however, that fine adjustment of the angular position of the bubble vials may facilitate manual calibration of the bubble vial to correctly indicate the position or alignment of the level into those predetermined angles.

SUMMARY OF EMBODIMENTS

According to an embodiment, a level includes an extruded body comprising a first portion having a first reference surface. The body also includes a second portion having a second reference surface, the second reference surface being spaced from the first reference surface. The body further includes an intermediate member comprising a wall positioned between the first portion and the second portion, the wall being generally perpendicular to at least one of the reference surfaces. The level also includes an orientation indicator coupled to the intermediate member, the orientation indicator being positioned to indicate an orientation of at least one of the first and the second reference surfaces. The level additionally includes an indicator support configured to support the orientation indicator, and a resilient member positioned between the orientation indicator and the indicator support. A compression the resilient member facilitates a calibration of the orientation indicator. Also, the indicator support supports the resilient member and engages opposite sides of the wall.

According to another embodiment, a level includes a body comprising a first portion having a first reference surface and a wall extending from the first portion generally perpendicular to the first reference surface. The level also includes an orientation indicator coupled to the wall, the orientation indicator being positioned to indicate an orientation of the first reference surface. The level additionally includes an indicator support configured to support the orientation indicator on the wall. The level further includes a resilient member positioned between the orientation indicator and the indicator support, wherein a compression the resilient member facilitates a calibration of the orientation indicator. The indicator support supports the resilient member and engages opposite sides of the wall.

According to another embodiment, a method for manufacturing a level includes extruding a body so as to provide the body with a first portion with a first reference surface, a second portion with a second reference surface, and a wall member between the first and second surfaces and disposed generally perpendicularly to at least one of the reference surfaces. The method also includes forming an opening in the first portion and in the wall member. The method also includes mounting an indicator support to the body, mounting a resilient member on the indicator support, and mounting an orientation indicator on the resilient member and positioned to be visible through at least one of the openings. The method further includes calibrating the orientation indicator relative to at least one of the reference surfaces, wherein the calibrating includes compression of the resilient member.

Additional and/or alternative objects, features, aspects, and advantages of the present invention will become apparent from the following description, the accompanying drawings, and the appended claims.

BRIEF DESCRIPTION OF THE DRAWINGS

For a better understanding of embodiments of the present invention, as well as other objects and further features thereof, reference is made to the following description which is to be used in conjunction with the accompanying drawings, where.

DETAILED DESCRIPTION OF EXEMPLARY EMBODIMENTS

Figure 1:
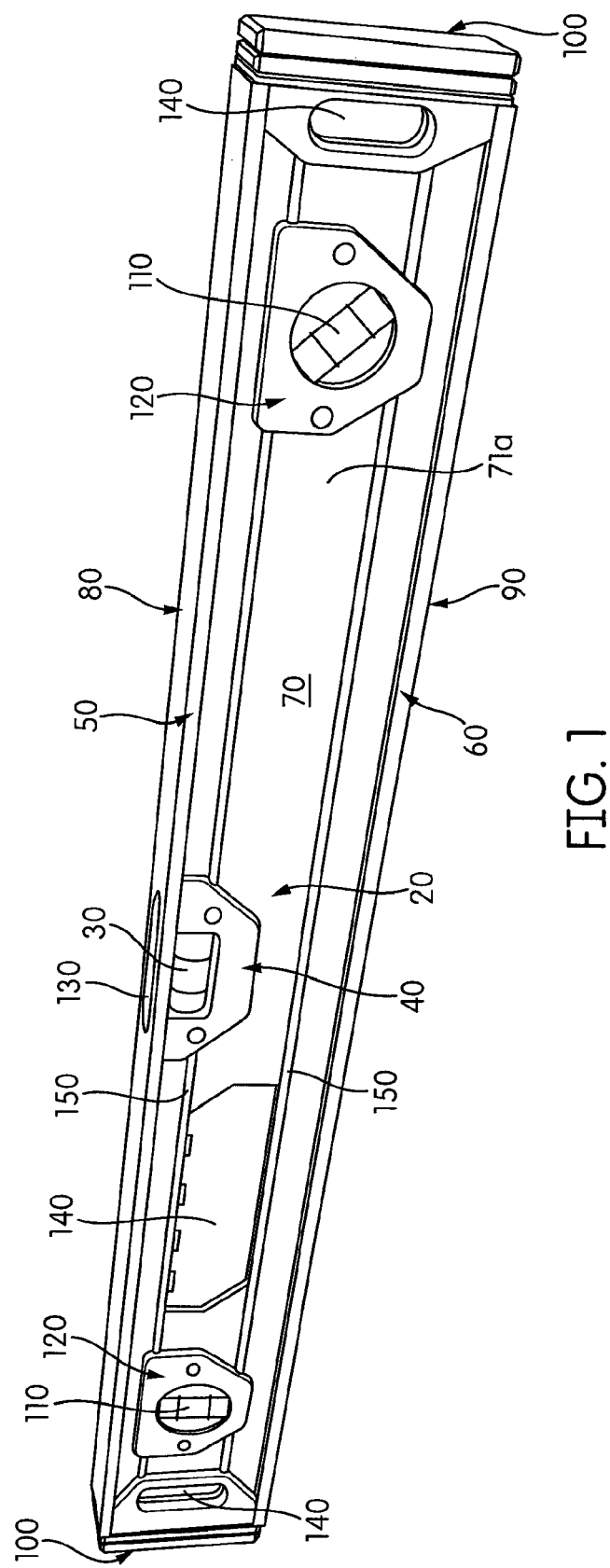
FIG. 1 is a perspective view of a level according to an embodiment.

FIG. 1 depicts a perspective view of an embodiment of a level 10. The level 10 includes a body 20 configured to support an orientation indicator 30 therein, via an indicator support 40, as described in greater detail below. As shown, the body 20 may be elongated, and includes a first portion 50 and a second portion 60 that are coupled by an intermediate member 70. It may be appreciated that the body 20 may thereby have a generally I-beam configuration wherein the first portion 50 and the second portion 60 extend outwards relative to the intermediate member 70. In one non-limiting embodiment, the intermediate member 70 comprises a wall of material (e.g., such as aluminum or steel) having opposite major surfaces 71a and 71b that are generally planar and generally parallel to one another.

The body 20 may be extruded, molded, or otherwise formed together, and may include hollow or skeletal portions formed from subsequent or simultaneous cutting and/or bending of the body 20. In various embodiments, the body 20 may comprise any suitable material or materials, including but not limited to wood, metals such as steel or aluminum, and/or plastic. In some embodiments, an outer surface 80 of the first portion 50, and an outer surface 90 of the second portion 60 may be generally flat and parallel to one another, whereby the outer surfaces 80 and 90 define respective first and second reference planes. As described in greater detail below, however, in the illustrated embodiment, the outer surfaces 80 and 90 may include curves or facets, which may be decorative and/or functional, and may extend inward towards the intermediate member 70. It may be appreciated, however, that the outer surfaces 80 and 90 may each include two outermost facets or lines generally extending along the length of the level 10, so as to define a reference plane therebetween. Accordingly, by contacting a generally flat surface of an object with the level 10 with either the outer surface 80 or the outer surface 90, the level 10 may be aligned with the flat surface of the object at either the first reference plane or the second reference plane.

Additionally illustrated in FIG. 1 is that in some embodiments the body 20 may be capped at opposing ends by end caps 100. In some embodiments, the end caps 100 may be slidably received within hollows or contours formed in the body 20. In some embodiments, the end caps 100 may be secured with adhesives, clips, fasteners, or other attachment mechanisms. In some embodiments, the end caps 100 may be integrally molded onto the body 20. In some embodiments, either or both of the body 20 and the end caps 100 may include engagement members that may snap fit into receiving members on the other of either or both of the body 20 and the end caps 100. While in the illustrated embodiment opposing outer surfaces of the end caps 100 are aligned with the reference planes associated with the first portion 50 and the second portion 60, in other embodiments the end caps 100 may define the reference planes at sides proximal to the first portion 50 and the second portion 60 (i.e. by extending outward from the first portion 50 and the second portion 60).

As further shown, in some embodiments the level 10 may include therein one or more additional orientation indicators 110, which may be supported in the body 20 by associated indicator mounts 120. While in some embodiments the indicator mounts 120 may be similar to the indicator support 40, described in greater detail below, in other embodiments the indicator mounts 120 may be of a generally conventional variety. As shown in the illustrated embodiment, in some embodiments the one or more additional orientation indicators 110 may be positioned at different orientations relative to the orientation of the first and second reference planes defined by the outer surfaces 80 and 90 of the first portion 50 and the second portion 60 respectively. For example, in various embodiments each of the additional orientation indicators 110 may be orientated at an angle of 90°, 45°, or 0° relative to the first and second reference planes (which may be appreciated as extending horizontally).

In some embodiments containing the additional orientation indicators 110, the additional orientation indicators 110 may be visible from opposing sides of the level 10, such as when viewing either opposing face of the intermediate member 70. It may be appreciated, however, that the indicator support 40 may be generally positioned adjacent to either of the first portion 50 or the second portion 60, so that the orientation indicator 30 may be visible through an aperture 130 formed therein. As shown in the illustrated embodiment, for example, the indicator support 40 is positioned adjacent to the first portion 50, so that the orientation indicator 30 may be viewed through the aperture 130 formed in the first portion 50. In such an embodiment, when the level 10 is placed on an object surface so that the outer surface 90 of the second portion 60 contacts the object surface, a user of the level 10 may view the orientation indicator 30 through a plane parallel to the reference planes.

Figure 2:
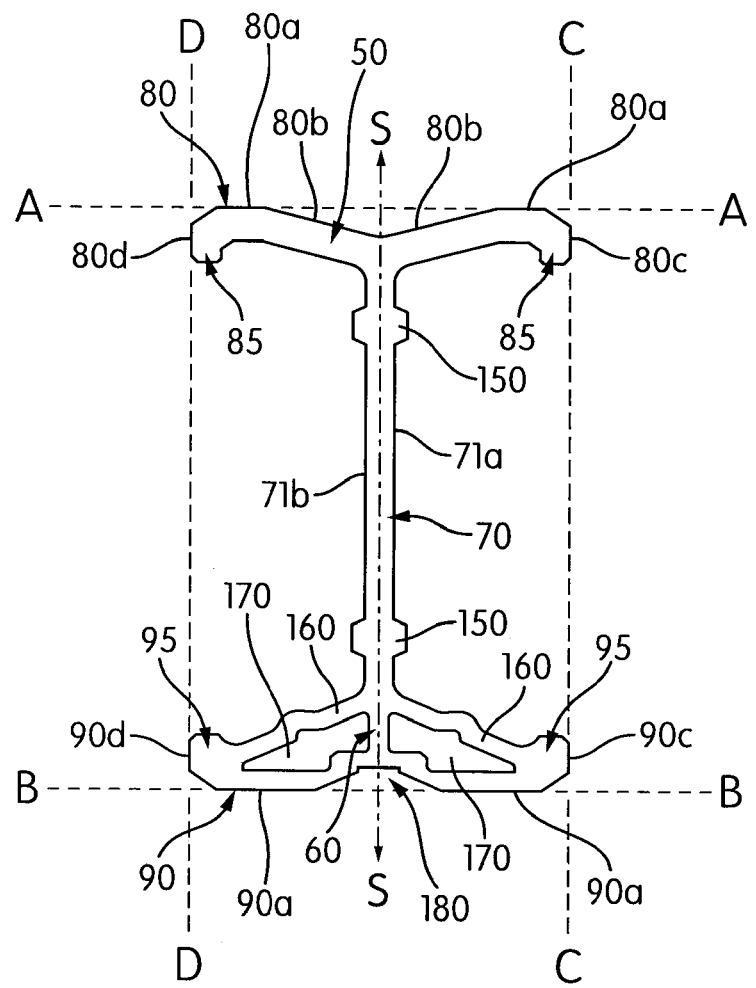
FIG. 2 is a cross sectional view of the level of FIG. 1, along an axis of symmetry thereof.

Further shown in FIG. 1 is that in some embodiments one or more apertures 140 may be formed in the intermediate member 70 of the body 20, which may (for example) allow the level 10 to be hung from a nail or other support so as to allow an angular orientation to be measured therefrom. It may be appreciated that in other embodiments further apertures may be formed in the intermediate member 70, and in some embodiments may be sufficiently formed therein so as to reduce the extruded or molded level 10 to a generally skeletal configuration. As indicated above, in some embodiments, however, the body 20 may be generally formed from an extruded or otherwise uniform mass, and thus may otherwise have a generally uniform cross sectional configuration. For example, FIG. 2 depicts a cross sectional view of the body 20, taken at a position spaced from the indicator support 40, the additional indicator mounts 120, and the aperture 140. With this cross sectional view, the generally I-beam configuration of the body 20 may be appreciated. In this embodiment, the body 20 is symmetrical about an axis of symmetry S. It may be appreciated that the axis of symmetry S may separate opposite faces of the body 20, each face having an associated side of the intermediate member 70. In other embodiments, the body may be asymmetrical. In some embodiments the body 20 may be formed (i.e. extruded or molded) generally with the cross sectional shape depicted in FIG. 2, but may be subsequently cut to form the apertures 130 and 140, as well as apertures 200 and 210 into which the indicator supports 40 and 120 may be received or may otherwise engage. In other embodiments, the shape of extrusion may be varied over time, so as to form the apertures therein.

As shown, in some embodiments the intermediate member 70 may contain ribs 150 extending generally along the length of the body 20, and protruding from the planar surfaces 71a, 71b. In some such embodiments, the ribs 150 may provide additional structural rigidity, or may provide an engaging surface for one or more of the indicator supports 40 and 120. In the illustrated embodiment, the first portion 50 extends outwards from the intermediate member 70, away from the axis of symmetry S. Again, the outer surface 80 of the first portion 50 (i.e. distal from the intermediate member 70) may be multi-faceted, curved, or have any other appropriate shape or configuration. Regardless of the shape of the first portion 50, it is understood that at least a portion of the outer surface 80 projecting furthest from the intermediate member 70 and the second portion 60, in the direction of the axis of symmetry S, extends across and defines a reference plane A for the level 10. The reference plane A itself extends into and out of FIG. 2, at the line A illustrated. Specifically, in the illustrated embodiment, the outer surface 80 includes reference surface portions 80a that may extend along the reference plane A, to operatively form a measuring surface. In the illustrated embodiment, the reference surface portions 80a are positioned on opposing sides of the axis of symmetry S, and are therefore flat along the reference plane A, as described above. As shown, in an embodiment angled surface portions 80b may recede inward from the reference plane A towards the intermediate member 70. In the illustrated embodiment, the angled surface portions 80b terminate at an intersection with the intermediate member 70.

Similarly, the outer surface 90 of the second portion 60 includes one or more reference surface portions 90a that project furthest from the intermediate member 70 and the first portion 50, in the direction of the axis of symmetry S, and extend across and define a reference plane B for the level 10. Like the reference plane A, the reference plane B itself extends into and out of FIG. 2, at the line B illustrated. In the illustrated embodiment, the second portion 60 is configured with additional angled support structures 160 that form internal hollow regions 170. It may be appreciated that the support structure 160 and portions of the second portion 60 associated with the outer surface 90 may generally form triangular cross sectional regions extending outward from the axis of symmetry S. Additionally, the second portion 60 may be configured with a recess 180 that is located inwards from the reference plane B towards the intermediate member 70, forming a space to receive one or more magnets therein. In the illustrated embodiment, angled surface portions 90b may recede inward from the reference plane B and the reference surface portions 90a, so as to form the recess 180. It may be appreciated that an outer surface of the one or more magnets may be aligned with the reference plane B, as described in greater detail below.

Further shown in the illustrated embodiment of FIG. 2 are side surfaces 80c and 80d associated with the first member 50, and side surfaces 90c and 90d associated with the second member 60. In the illustrated embodiment, the side surfaces 80c and 80d are formed on inwardly extending flange portions 85 of the first portion 50. Likewise, the side surfaces 90c and 90d of the illustrated embodiment are formed on inwardly extending flange portions 95 of the second portion 60. In some embodiments, however, the side surfaces 80c and 80d may couple directly to the reference surface portions 80a. Additionally, in some embodiments the side surfaces 90c and 90d may couple directly to the reference surface portions 90a.

As shown, the side surface 80c and the side surface 90c may extend across and defines a reference plane C for the level 10. The reference plane C itself extends into and out of FIG. 2, at the line C illustrated. In the illustrated embodiment, the reference plane C is perpendicular to the reference planes A and B. As such, it may be appreciated that the side surfaces 80c and 90c may form another operative reference surface for the level 10. Additionally, the side surface 80d and the side surface 90d may extend across and defines a reference plane D for the level 10. The reference plane D itself extends into and out of FIG. 2, at the line D illustrated. In the illustrated embodiment, the reference plane D is parallel but spaced from the reference plane C (opposite from the reference plane C relative to the axis of symmetry S), and as such is also perpendicular to the reference planes A and B. Accordingly, it may be appreciated that the side surfaces 80d and 90d may form another operative reference surface for the level 10. In the illustrated embodiment, the major outer surfaces 71a and 71b of the wall of the intermediate member 70 are generally parallel to the side surfaces 80c, 80d, 90c, and 90d, and thus are generally perpendicular to the reference surfaces 80a and 90a that define the reference planes A and B.

Figure 3:
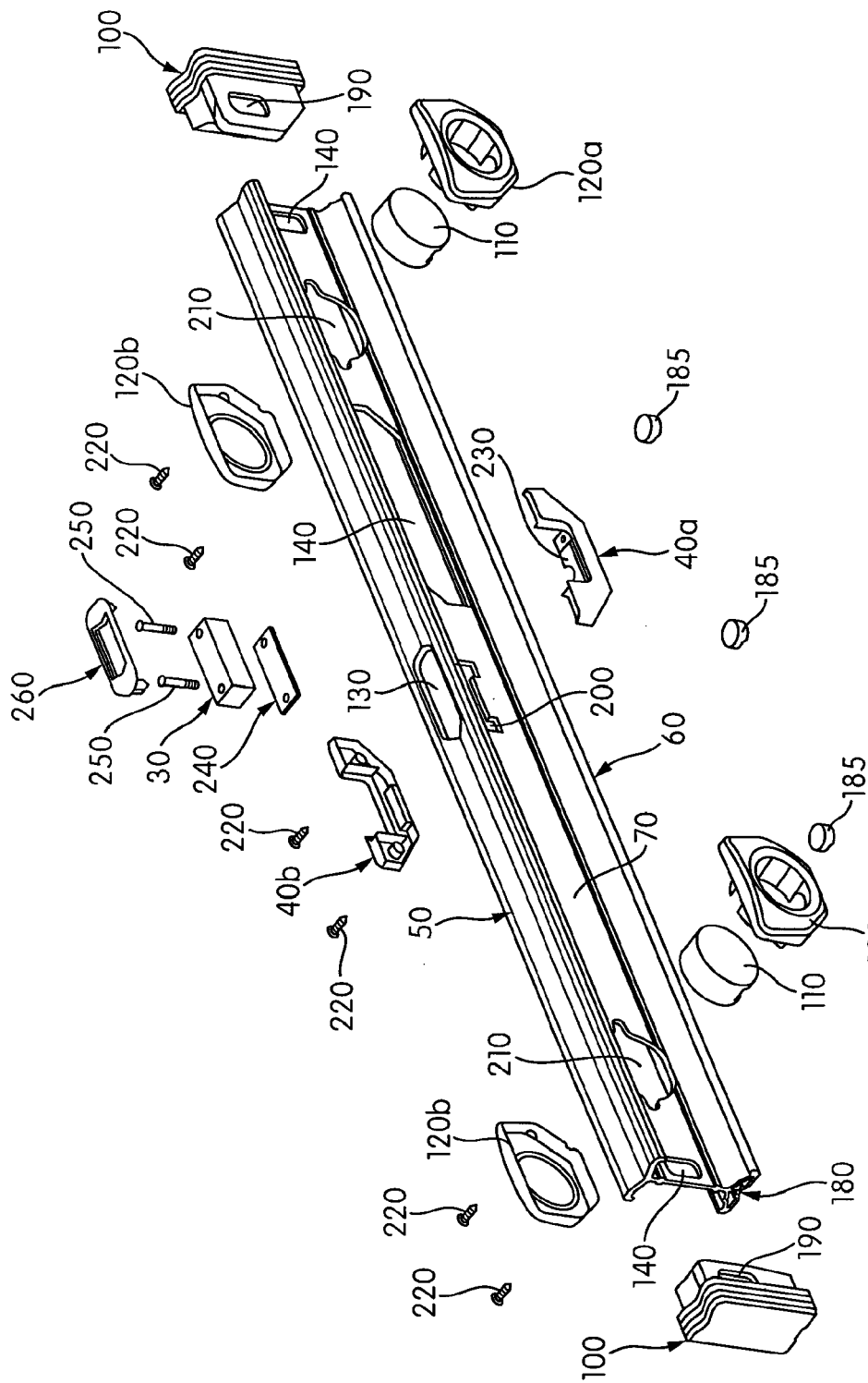
FIG. 3 is an exploded view of the level of FIG. 1, showing the constituent portions thereof.

FIG. 3 depicts an exploded view of the level 10. As shown, a plurality of magnets 185 are provided, and may be received in the recess 180. The magnets 185 may be secured by epoxy, clips, adhesive, or may be slidably received in a groove associated with the recess 180. Other engagements between the magnets 185 and the recess 180 are also possible. While the magnets 185 are retained in the recess 180 of the second portion 60 in the illustrated embodiment, in other embodiments, the magnets 185 may additionally or alternatively be retained in a groove associated with the first portion 50. Additionally appreciable in FIG. 3 are the apertures 140 formed in the intermediate member 70. As indicated above, some of the apertures 140 may remain uncovered and unobstructed following assembly of the level 10. For example, the apertures 140 associated with the end caps 100 may remain unobstructed despite the surrounding region of the intermediate member 70 being surrounded by engaging portions of the end caps 100. As shown in the illustrated embodiment, this may be accomplished by the end caps 100 containing complementary apertures 190 that align with those apertures 140.

It may be appreciated that some of the apertures formed in the intermediate member 70 may receive the indicator supports 40, 120 therein, which may at least partially obstruct the apertures. For example, an aperture 200 is formed in the intermediate member 70, and is configured to receive the orientation indicator 30 and constituent portions of the indicator support 40 (described in greater detail below) therein. Additionally, further apertures 210 may be formed in the intermediate member 70, and may receive therein the additional orientation indicators 110 and the constituent components of the associated additional indicator mounts 120.

In some embodiments, the indicator support 40 includes a first support member 40a and a second support member 40b, which may each be positioned on opposite faces of the intermediate member 70. As shown, the first support member 40a and the second support member 40b may extend towards each other partially through the aperture 200, and partially engaging the intermediate member 70. The first support member 40a and the second support member 40b may then be secured to one another. In various embodiments, such securement may be facilitated by adhesive, molding, clips, clamps, fasteners, or by any other appropriate mechanism. In some embodiments, either or both of the first support member 40a and the second support member 40b may include engagement members that may snap fit into receiving members on the other of either or both of the first support member 40a and the second support member 40b. In some embodiments, a plurality of securement mechanisms may be utilized. In the illustrated embodiment, threaded fasteners 220 are configured to extend through the second support member 40b into the first support member 40a, drawing the first support member 40a and the second support member 40b towards one another, to clamp around the intermediate member 70, sandwiching the wall therebetween. As described in greater detail below, it may be appreciated that either or both of the first and second support members 40a and 40b may contain or be configured to create a support platform which may receive the orientation indicator 30 thereon. In the illustrated embodiment, a support platform 230 is located on the first support member 40a, and configured to extend through the aperture 200. While in the illustrated embodiment the support platform 230 may be planar, in other embodiments the support platform 230 may be of any other appropriate shape.

As additionally shown, a resilient member 240 is configured to be received between the orientation indicator 30 and the support platform 230. It may be appreciated that the resilient member 240 may comprise any material or materials that may be selectively compressed sufficiently in one or more regions so as to adjust an angular orientation of the orientation indicator 30 relative to the remainder of the level 10 (and in particular to the first and second reference planes A and B described above. For example, in various embodiments the resilient material may comprise rubber, soft/deformable plastic, one or more springs, or another material configured to be selectively compressed at a portion thereof. One or more engagement members may be configured to apply a force against the orientation indicator 30 so as to selectively compress the resilient member 240. In the illustrated embodiment, a pair of adjustment members 250 are provided, configured as threaded fasteners in this embodiment, which are configured to extend through the opposite ends of the orientation indicator 30 and corresponding ends of the resilient member 240, and be received in apertures in the support platform 230. It may be appreciated that other mechanisms for adjustably compressing the resilient member 240 are also possible in other embodiments. For example, in some embodiments, one or more adjustable clamp members may press the orientation indicator 30 into the resilient member 240, without necessarily extending through a portion of the orientation indicator 30 itself.

Similar to the indicator support 40, the additional indicator mounts 120 may also be configured with associated first mount members 120a and second mount members 120b, which extend through the associated apertures 210 to be secured around the intermediate member 70. Again, the securement may be facilitated by adhesive, molding, clips, clamps, fasteners, or by any other appropriate mechanism. In the illustrated embodiment, additional threaded fasteners 220 are configured to extend through the second mount members 120b into the first mount members 120a, drawing the first mount member 120a and the second mount member 120b towards one another, to clamp around the intermediate member 70, securing the additional orientation indicators 110 therein. In an embodiment the additional orientation indicators 110 may each include an engagement member therein, which may be received in or may receive an associated engagement member associated with either or both of the first mount member 120a and the second mount member 120b, securing the additional orientation indicator 110 at a fixed orientation with respect to the indicator mounts 120, and thus with the remainder of the level 10.

Figure 4:
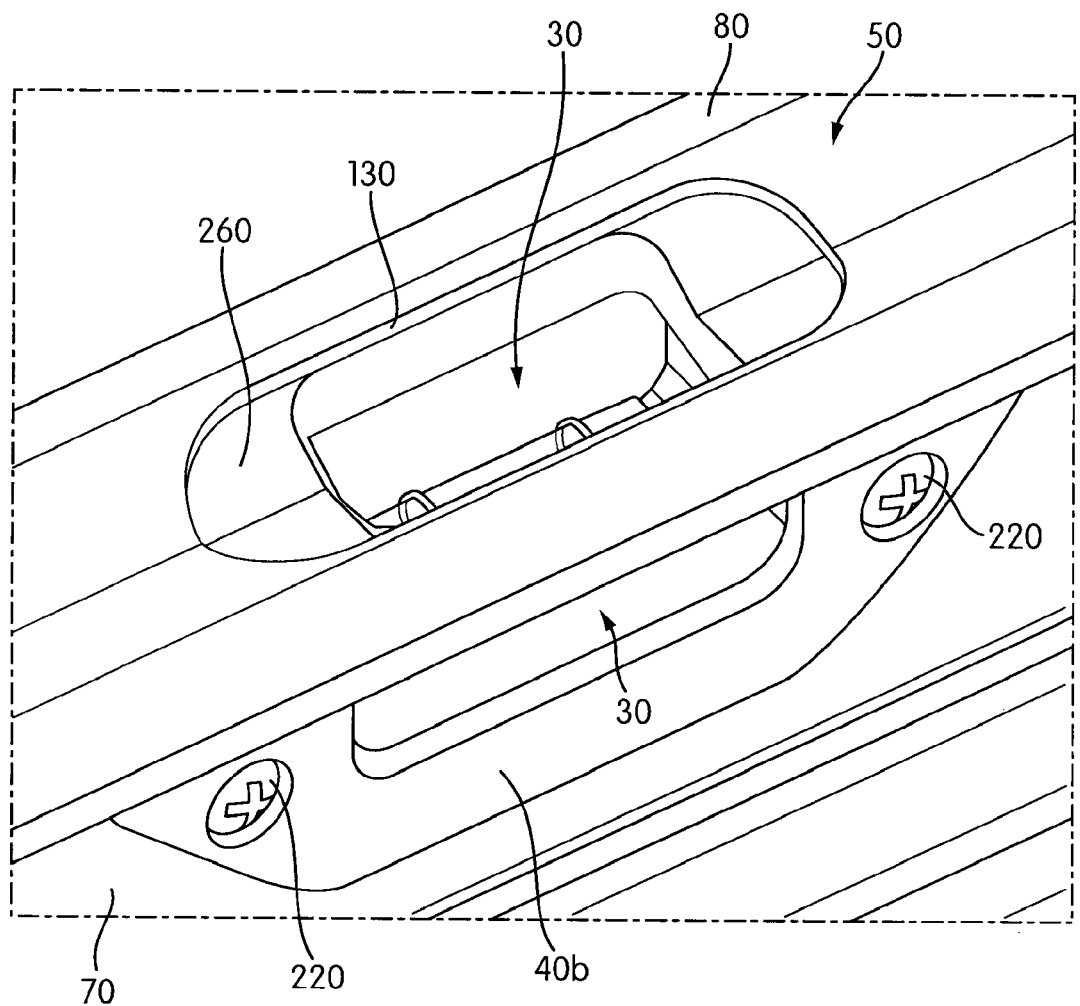
FIG. 4 is top perspective view of a portion of the level of FIG. 1.

In the illustrated embodiment, a cover 260 is configured to be received through the aperture 130 so as to cover the adjustment members 250 when the orientation indicator 30 and indicator support 40 are assembled into the level 10. It may be appreciated, however, that the cover 260 still contains an aperture therein, allowing the orientation indicator 30 to be viewed through the first portion 50, as illustrated in FIG. 4.

Figure 5:
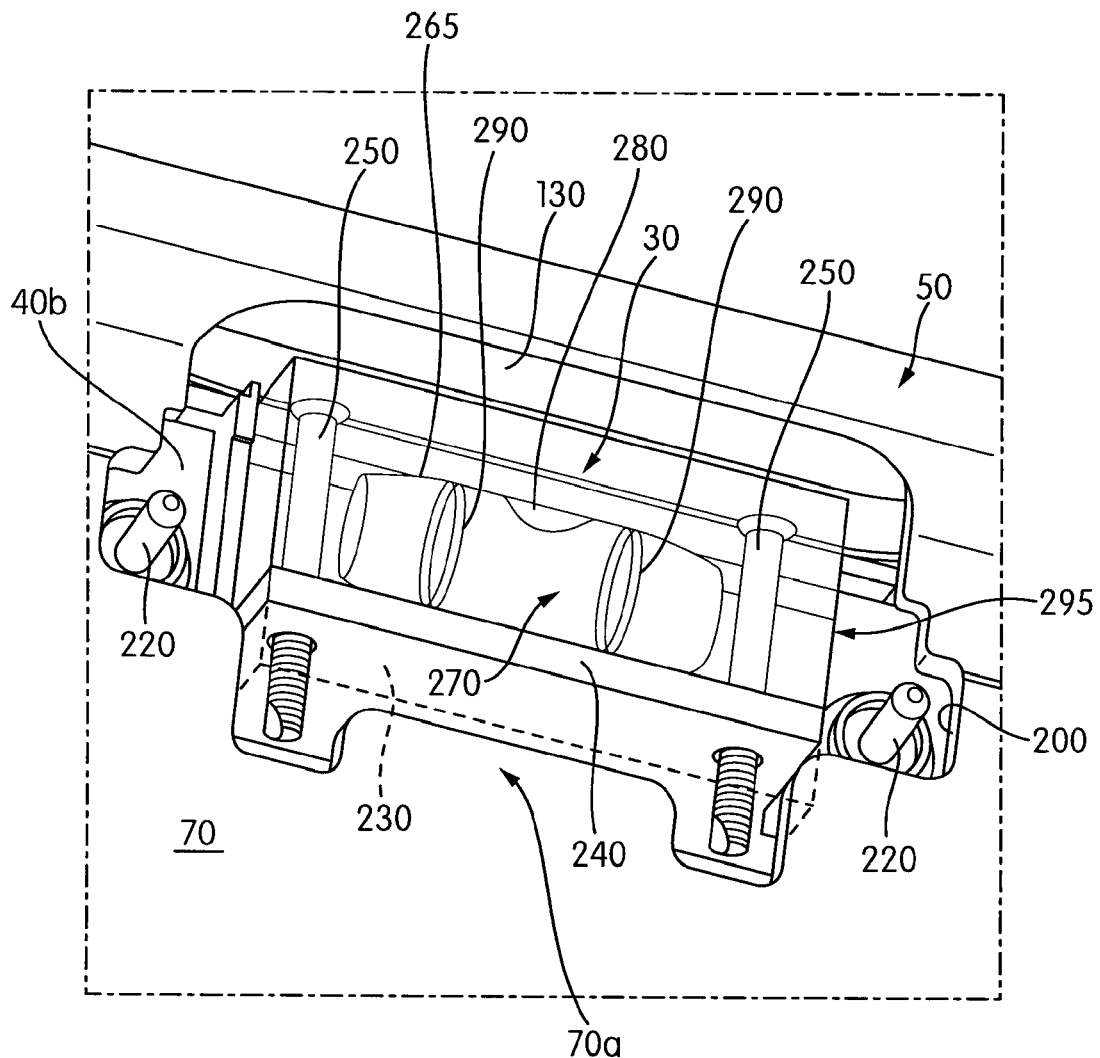
FIG. 5 is a reduced side perspective view of the level of FIG. 1, illustrating an engagement between an orientation indicator of the level and a body of the level.

FIG. 5 depicts a reduced close-up perspective view of the orientation indicator 30 installed into the level 10. Although the first support member 40a is omitted, the support platform 230 associated therewith is illustrated in dashed lines, to depict the engagement therewith by the resilient member 240. As further shown, the aperture 200 in the intermediate member 70 joins the aperture 130 formed in the first portion 50. Additionally, the aperture 200 is configured so as to not interfere with the threaded fasteners 220, which extend from the second support member 40b, to engage a corresponding receptacle in the first support member 40a. Additionally, the aperture 200 may be shaped so that a portion of the intermediate member 70, specifically portion 70a in the view of FIG. 5, may be sandwiched within the indicator support 40, and may further support the orientation indicator 30, the support pad 240, and/or the support platform 230 during application of a downward force from the adjustment members 250.

While the orientation indicator 30 may vary across embodiments, in the illustrated embodiment the orientation indicator 30 comprises a conventional block type bubble vial, which comprises a chamber 265 filled with a liquid/spirit 270, having a bubble 280 therein. In other embodiments, any other type of suitable orientation indicator may be used without deviating from the scope of the present invention (e.g., bubble/spirit hemisphere; barrel vial, ball within a vial, pendulum, plum bob, etc). The bubble 280 in the orientation indicator 30 of the illustrated embodiment indicates the orientation of the associated reference planes A and B of the level 10 along a longitudinal axis of the orientation indicator 30 relative to horizontal. It may be appreciated that the liquid 270 and the bubble 280 may each be of any appropriate configuration, including any suitable liquid 270 and any suitable gas for the bubble 280, or the liquid 270 and the bubble 280 both being liquids of differing density. While in the illustrated embodiment graduation markings 290 generally indicate to a user of the level 10 whether the level 10 is being held somewhat level or substantially unlevel, in other embodiments angle markings or other appropriate demarcations may be denoted on the orientation indicator 30, to provide a more accurate measurement of the orientation of the level 10. As may further be appreciated in FIG. 5, the chamber 265 may be formed in an at least partially transparent housing 295, which may allow a user of the level 10 to view the chamber 265 therethrough. In various embodiments, the housing 295 may comprise glass, acrylic, or another clear glassy or plastic material. As shown, the adjustment members 250 may extend through the housing 295, without piercing the chamber 265 containing the liquid 270. Other mechanisms for securing the transparent housing 295 of the orientation indicator 30 relative to the support platform 230 are also possible in other embodiments, as described above.

Figure 6A:
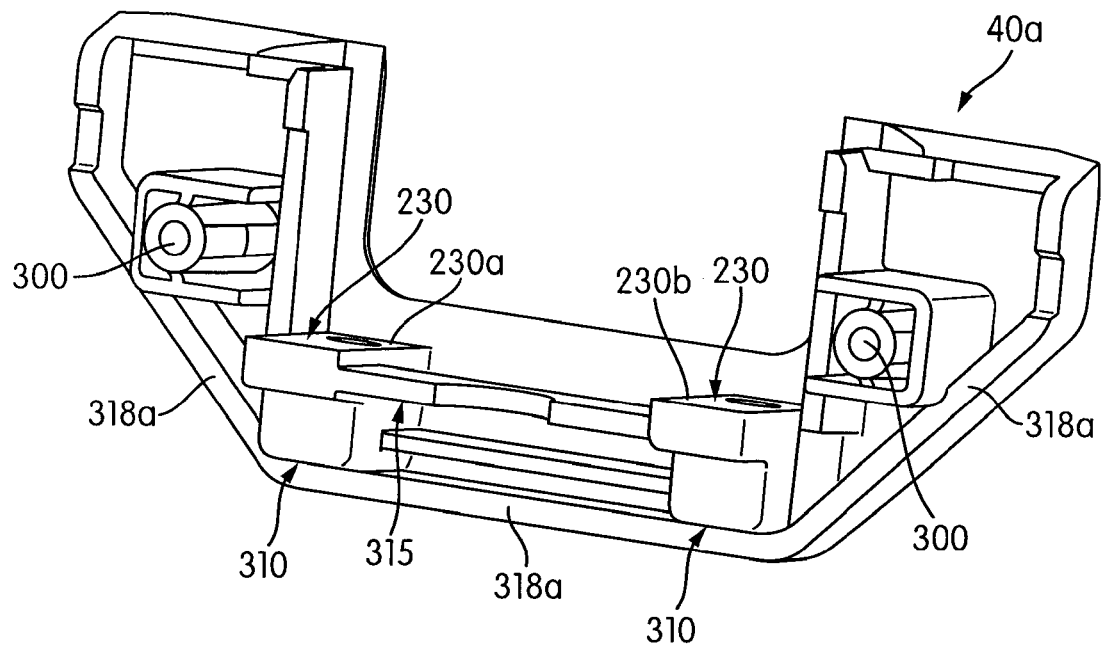
FIGS. 6A-B illustrate isometric views of respective portions of an indicator support configured to engage opposite sides of the body of the level of FIG. 5.
Figure 6B:
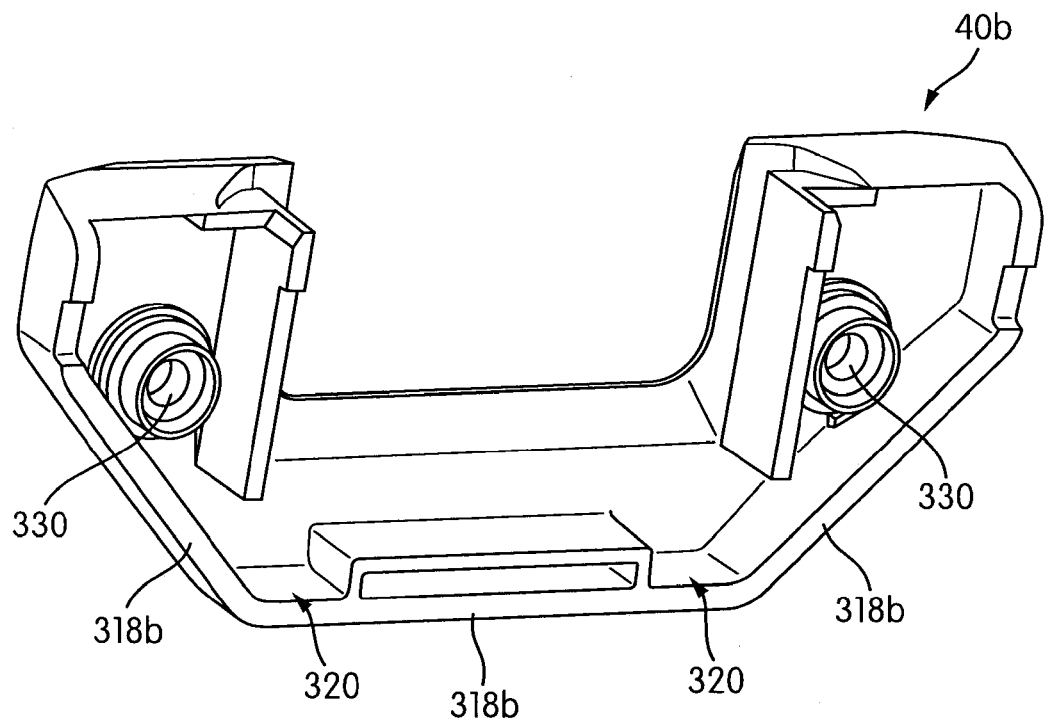

FIGS. 6A and 6B illustrate views of components of an embodiment of the indicator support 40. In particular, FIG. 6A shows an isometric view of the first support member 40a, with the support platform 230 formed thereon. As shown, in the illustrated embodiment the support platform 230 comprises separate support surfaces 230a and 230b, each associated with one of the adjustment members 250. In some embodiments, separate resilient members 240 may be associated with each of the separate support surfaces 230a and 230b, and may individually be compressed to adjust the calibration of the orientation indicator 30 of the level 10. Additionally shown in FIG. 6A are receiving portions 300 configured to receive the threaded fasteners 220 therein, to draw the first support member 40a and the second support member 40b together. Further illustrated are protruding portions 310 associated with the support platform 230, configured to be received in the second support member 40b, to provide additional support for the orientation indicator 30 within the indicator support 40. It may be appreciated that in an embodiment the aperture 200 formed in the intermediate member 70 may be shaped such that the portion 70a is received between protruding portions 310, and may engage a beam contacting portion 315 extending between the protruding portions 310. As such, the beam-contacting portion 315 may provide an additional surface area of engagement between the intermediate member 70 and the indicator support 40, such as a top surface of the portion 70a sandwiched between the first support member 40a and the second support member 40b. It may also be understood that a side surface 318a of the first support member 40a may be configured to engage the major outer surface 71a of the intermediate member 70 as the first support member 40a is installed into the body 20.

FIG. 6B illustrates the second support member 40b, which may have corresponding side surfaces 318b configured to engage the major outer surface 71b of the intermediate member 70 as the second support member 40b is installed into the body, and engages the first support member 40a, as described below. The second support member 40b also may contain receiving portions 320 that may receive the protruding portions 310 thereon. It may be appreciated that a directional force on the support surface 230a or the support surface 230b of the first support member 40a may then apply a corresponding force on the second support member 40b, via the receiving portions 320. Also shown in the second support member 40b are fastener through holes 330, configured to allow the shaft of the threaded fastener 220 to pass therethrough, so that a head of the threaded fastener may engage the second support member 40b to push the second support member 40b towards the first support member 40a, while the threadings of the threaded fastener 220 pull the first support member 40a towards the second support member 40b. As indicated above, other engagements therebetween are additionally or alternatively possible.

Figure 7A:
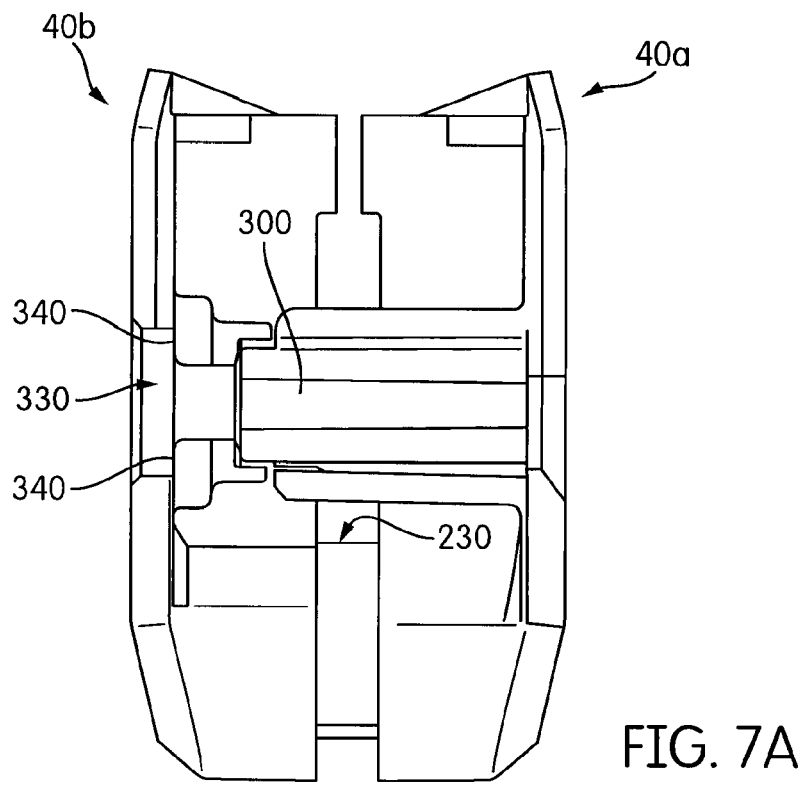
FIGS. 7A-B illustrate perspective cross sectional views of the portions of the indicator support of FIGS. 6A and 6B as assembled together, configured to sandwich a portion of the body of the level therebetween.
Figure 7B:
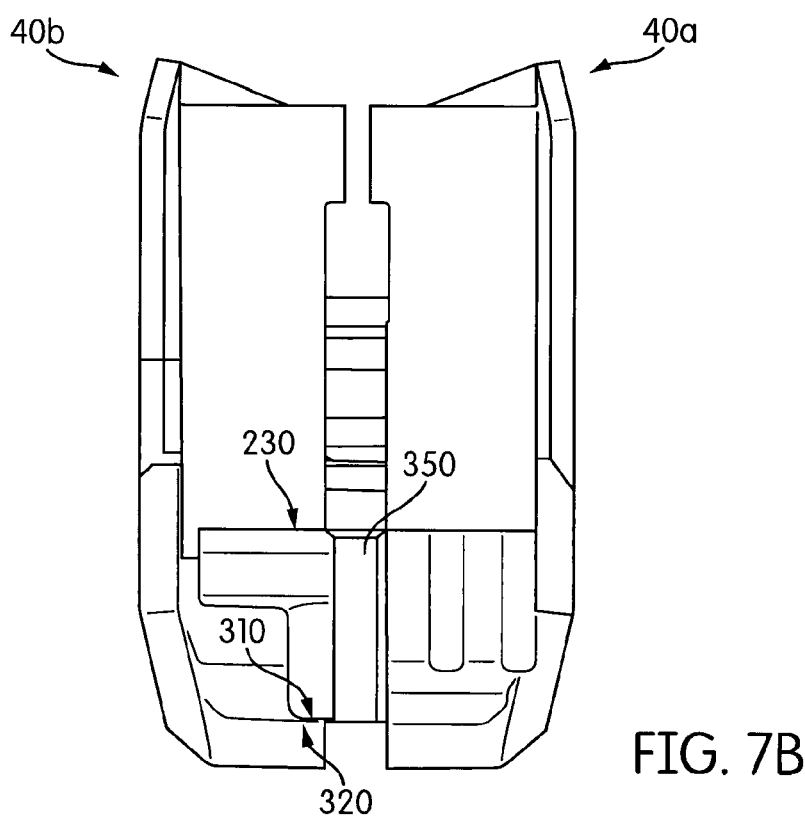

FIGS. 7A-B illustrate reduced perspective cross sectional views of the indicator support 40, showing the engagement of the first support member 40a and the second support member 40b through the aperture 200 of the level 10. Specifically, FIG. 7A illustrates a view of the indicator support 40 sectioned along where one of the threaded fasteners 220 may engage the first support member 40a to the second support member 40b. As shown, a threaded fastener 220 may enter into the fastener through hole 330 of the second support member 40b and into the receiving portion 300 of the first support member 40a, which may threadedly engage the threaded end of the threaded fastener 220. An engaging surface 340 associated with the fastener through hole 330 may engage with the head of the threaded fastener 220, as described above, to pull the second support member 40b towards the first support member 40a, so as to compress the first support member 40a and the second support member 40b onto the intermediate member 70 (not depicted in FIG. 7A). FIG. 7B depicts another cross sectional view, sectioned where the adjustment member 250 may engage the support platform 230 (formed on the first support member 40a in the illustrated embodiment). As shown, part of the protruding portion 310 of the first support member 40a may rest on the receiving portion 320 of the second support member 40b, so as to provide additional stability for the indicator support 40 around the intermediate member 70.

Although not shown in FIG. 7B, the adjustment members 250 may extend through the orientation indicator 30, into a receiving portion 350 of the support platform 230, or another portion of the first support member 40a and/or a portion of the second support member 40b, so as to compress the resilient member 240 to adjust the orientation of the orientation indicator 30 relative to the remainder of the level 10 (and in particular the first reference plane A and the second reference plane B, described above). As shown, in an embodiment the receiving portion 350 may be generally aligned centrally to the intermediate member 70. While in some embodiments a gap may exist between the receiving portion 350 and the intermediate member 70, so as to allow the adjustment member 250 to extend through the receiving portion 350, in other embodiments the intermediate member 70 may abut the protruding portion 310 (including, for example, the bottom of the receiving portion 350), so as to provide additional engagement between the indicator support 40 and the intermediate member 70.

Figure 8:
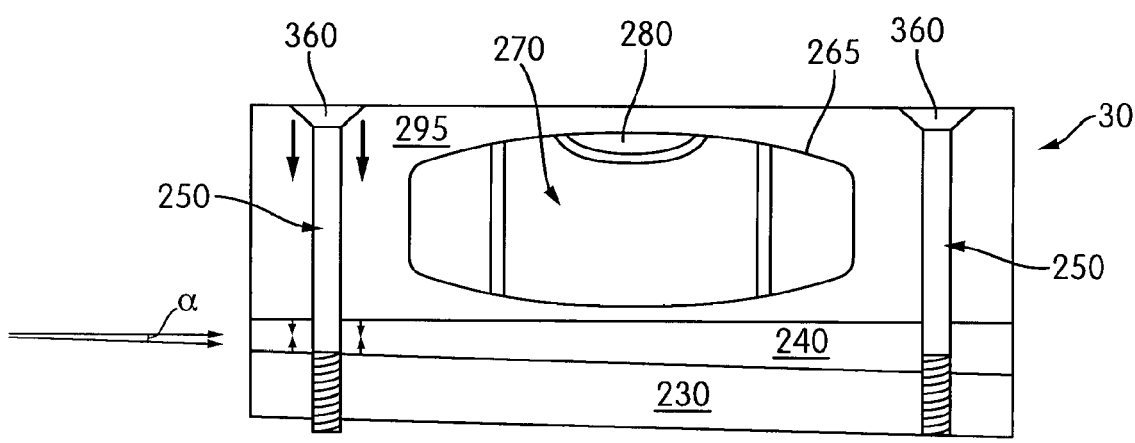
FIG. 8 is a schematic view of the engagement of FIG. 5, showing an embodiment of a calibration of the orientation indicator through compression of a resilient member between the orientation indicator and an indicator support mounted to the body of the level.

FIG. 8 schematically depicts the engagement between the adjustment members 250, the housing 295 of the orientation indicator 30, the resilient member 240, and the support platform 230, so as to illustrate the calibration of the orientation indicator 30. In particular, it may be appreciated that by driving the adjustment members 250 into the support platform 230, a head 360 of the adjustment members 250 may pull an associated portion of the housing 295 towards the support platform 230, thus compressing the associated portion of the resilient member 240 therebetween. Accordingly, an angle α that the orientation indicator 30 forms with respect to the support platform 230 (and the remainder of the level 10) may be calibrated through manipulation of either or both of the adjustment members 250. Specifically, with the threaded fastener configuration of the adjustment members 250, by screwing one of the adjustment members 250 into the support platform 230 to a greater extend than another of the adjustment members 250, the resilient member 240 is compressed to a greater extent on that side, angling the orientation indicator 30 and the chamber 265 of liquid 270 therein. Accordingly, a position of the bubble 280 when the orientation indicator 30 is horizontal may be calibrated.

It may be appreciated that in operation, the level 10 may be calibrated by positioning the level 10 on a calibration surface having a known orientation. Specifically, the calibration surface having the known orientation may generally be a horizontally level surface. Thus, when the reference planes A or B are placed on the reference surface, the orientation indicator 30 should have the bubble positioned to indicate a level surface (e.g., the bubble should be midway between lines or markings 290). In other embodiments, it may be appreciated that the indicator support 40 may generally support the orientation indicator 30 and the resilient member 240 generally perpendicular to the reference planes A and B, so as to allow for a calibrated 90° (i.e. vertical) orientation. Specifically, the indicator support 40 may engage opposite sides of the aperture 200, so that the support platform 230 extends generally perpendicular to the reference planes. The orientation indicator 30 may therefore be positioned to be visible from the opposite faces of the body 20, and may additionally be visible through aperture 130 (and/or a complementary aperture formed in the second portion 60. In still other embodiments, other reference angles may be calibrated. Regardless of the reference surface being calibrated against, calibrating the orientation indicator 30 comprises adjusting a compression of the resilient member 240 until the orientation indicator 30 indicates an orientation equal to that of the surface having the known orientation. Again, while the adjusting may comprise tightening or loosening one or more of the adjustment members 250 to cause the compression of the resilient member 240, in other embodiments other mechanisms for selectively compressing the resilient member 240 supported in the I-beam of the level 10 may additionally or alternatively be utilized.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:
1. A level comprising:
 an extruded body, the body comprising:
  a first portion having a first reference surface;
  a second portion having a second reference surface, the second reference surface being spaced from the first reference surface; and
  an intermediate member comprising a wall positioned between the first portion and the second portion, the wall being generally perpendicular to at least one of the reference surfaces;
 an orientation indicator coupled to the intermediate member, the orientation indicator being positioned to indicate an orientation of at least one of the first and the second reference surfaces;
 an indicator support configured to support the orientation indicator;

a resilient member positioned between the orientation indicator and the indicator support, wherein a compression of the resilient member facilitates a calibration of the orientation indicator; and wherein the indicator support supports the resilient member and engages opposite sides of the wall.

2. The level of claim 1, wherein at least a portion of the first reference surface and the second reference surface recede from a first reference plane and/or a second reference plane, towards the intermediate member, such that only portions of the first reference surface and/or the second reference surface define the first reference plane and the second reference plane respectively.

3. The level of claim 1, wherein at least one of the first portion and the second portion includes an aperture therein such that the orientation indicator is visible through the first reference surface and/or the second reference surface.

4. The level of claim 1, wherein the indicator support extends on opposite faces of the intermediate member.

5. The level of claim 4, wherein the orientation indicator is visible from each of the opposite faces of the intermediate member.

6. The level of claim 4, wherein the indicator support comprises a first support member and a second support member, each positioned on a respective face of the intermediate member, and secured to one another to secure the indicator support to the intermediate member.

7. The level of claim 6, wherein the first support member and the second support member are secured to one another by one or more engagement members.

8. The level of claim 7, wherein the one or more engagement members securing the first support member and the second support member comprise one or more of threaded fasteners, clips, clamp members, and adhesive.

9. The level of claim 1, further comprising a support platform formed on the indicator support, configured to receive the resilient member and the orientation indicator thereon.

10. The level of claim 9, wherein the support platform is planar.

11. The level of claim 1, further comprising one or more engagement members configured to apply a force against the orientation indicator into the indicator support to generate compression of a portion of the resilient member relative to another portion of the resilient member.

12. The level of claim 11, wherein the one or more engagement members configured to apply the force against the orientation indicator into the indicator support comprises a threaded fastener extending through mounting portions of the orientation indicator, the resilient member and the indicator support, so as to apply a selective amount of force therebetween.

13. The level of claim 11, wherein the one or more engagement members configured to apply the force against the orientation indicator into the indicator support comprise an adjustable clamp member.

14. The level of claim 1, wherein the orientation indicator comprises a bubble vial containing a liquid and a bubble therein, the bubble vial being shaped such that an angular orientation thereof affects a position of the bubble relative to the bubble vial, and wherein the compression of a portion of the resilient member determines the angular orientation of the bubble vial relative to each of the first and the second reference planes.

15. The level of claim 14, wherein the bubble vial comprises a transparent material surrounding a chamber enclosing the liquid and bubble.

16. The level of claim 15, wherein the transparent material comprises one or more of glass or acrylic.

17. The level of claim 1, further comprising one or more additional orientation indicators, each associated with indicating a particular angle of the first and the second reference planes.

18. The level of claim 17, wherein the particular angle associated with the one or more additional indicators comprises one or more of 90°, 45° and 0° relative to a horizontal position of the first and second reference planes.

19. The level of claim 1, wherein the resilient member comprises one or more of rubber, deformable plastic, or another material configured to be selectively compressed at a portion thereof between the orientation indicator and the indicator support.

20. The level of claim 1, wherein the first portion, the second portion, and the intermediate member are formed from one or more of aluminum, steel, elastomer, wood, plastic, or metal.

21. The level of claim 1, wherein at least one of the first member and the second member are configured to retain one or more magnets therein, wherein outer surfaces of the one or more magnets are aligned with the first reference plane and/or the second reference plane.

22. A level comprising:
a body comprising:
a first portion having a first reference surface;
a wall extending from the first portion generally perpendicular to the first reference surface;
an orientation indicator coupled to the wall, the orientation indicator being positioned to indicate an orientation of the first reference surface;
an indicator support configured to support the orientation indicator on the wall;
a resilient member positioned between the orientation indicator and the indicator support, wherein a compression of the resilient member facilitates a calibration of the orientation indicator;
wherein the indicator support supports the resilient member and engages opposite sides of the wall.

23. A method for manufacturing a level comprising:
extruding a body so as to provide the body with a first portion with a first reference surface, a second portion with a second reference surface, and a wall member between the first and second surfaces and disposed generally perpendicularly to at least one of the reference surfaces;
forming an opening in the first portion and in the wall member;
mounting an indicator support to the body;
mounting a resilient member on the indicator support;
mounting an orientation indicator on the resilient member and positioned to be visible through at least one of the openings; and
calibrating the orientation indicator relative to at least one of the reference surfaces, wherein the calibrating includes compression of the resilient member.

* * * * *